(12) United States Patent
Zager et al.

(10) Patent No.: US 6,687,790 B2
(45) Date of Patent: *Feb. 3, 2004

(54) SINGLE BANK ASSOCIATIVE CACHE

(75) Inventors: Edward Zager, San Jose, CA (US); Gregory Mathews, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/930,031

(22) Filed: Aug. 14, 2001

(65) Prior Publication Data

US 2002/0029312 A1 Mar. 7, 2002

Related U.S. Application Data

(63) Continuation of application No. 08/285,411, filed on Aug. 3, 1994, now Pat. No. 6,275,901.

(51) Int. Cl.[7] ............................................. G06F 13/00
(52) U.S. Cl. ........................................ 711/128; 711/132
(58) Field of Search .................................. 711/128, 132

(56) References Cited

U.S. PATENT DOCUMENTS

| | | | |
|---|---|---|---|
| 5,113,506 A | * | 5/1992 | Moussouris et al. ........... 711/3 |
| 5,193,163 A | * | 3/1993 | Sanders et al. ............. 711/122 |
| 5,412,787 A | * | 5/1995 | Forsyth et al. .............. 711/207 |

OTHER PUBLICATIONS

INTEL, i486 Processor Hardware Reference Manual, Intel Corp., 1990, pp. 3–1 to 3–11 and 6–32 to 6–33.*
M68000 Family Reference, Motorola inc., 1988, pp. 3–108 to 3–138.*
Crisp et al., 'Designing A Cache For A Fast Processor', Electronic Design, Oct. 13, 1998, pp. 111–118.*
Shear, 'Cache–memory systems benefit from on–chip solutions', EDN, Dec. 10, 1987, pp. 245–260.*
Smith, 'Cache memory design an evolving art', IEEE, 12/87, pp. 40–44.*

* cited by examiner

*Primary Examiner*—Reba I. Elmore
(74) *Attorney, Agent, or Firm*—Blakely, Sokoloff, Taylor & Zafman LLP

(57) ABSTRACT

A cache controller is intimately associated with a microprocessor CPU on a single chip. The physical address bus is routed directly from the CPU to the cache controller where it is sent to the cache tag directory table. For a cache hit, the cache address is remapped to the proper cache set address. For a cache miss, the cache address is remapped in accordance with the LRU logic to direct the cache write to the least recently used set. The cache is thereby functionally divided into associative sets, but without the need to physically divide the cache into independent banks of SRAM.

13 Claims, 2 Drawing Sheets

SINGLE BANK ASSOCIATIVE CACHE

The present patent application is a Continuation of prior application Ser. No. 08/285,411, filed Aug. 3, 1994, now U.S. Pat. No. 6,275,901 entitled SINGLE BANK ASSOCIATIVE CACHE, which claims priority to prior application Ser. No. 07/595,175 filed Oct. 9, 1990.

FIELD OF THE INVENTION

This invention relates to the field of cache memories for microprocessors, and particularly to an associative cache requiring a single bank of SRAM devices.

BACKGROUND OF THE INVENTION

A significant barrier to improving the performance of a microprocessor system is the access time of system memory. Although the speed of semiconductor memories has improved over time, the speed of DRAM devices has not kept pace with the speed of the processors. Consequently, when executing most applications, a processor will experience numerous wait states while system memory is accessed. A frequently employed solution to this problem is the incorporation in the microprocessor system of a high-speed cache memory comprising SRAM devices. In general, a cached system will experience significantly fewer wait states than a non-cached system.

The simplest form of cache is generally referred to as a direct-mapped cache, wherein contents of the system memory are retrieved and stored in cache locations having the same low-order address. For example, if an 8K cache is provided, the thirteen lowest order address bits of the system memory location to be retrieved define the cache storage location. A significant disadvantage of a direct-mapped cache is that the cache contents will be overwritten whenever there is an access request to a system memory location having the same low order address but a different high order address.

To overcome this disadvantage, a set associative cache structure is sometimes used. For example, with a two-way set associative cache, the cache memory is physically divided into two banks of SRAMs. Thus, a two-way set associative 8K cache would comprise two 4K banks of SRAM. Data retrieved from system memory may be mapped into either one of the two banks since the two banks have identical low order addresses. A cache hit in one bank causes a least recently used (LRU) flag to be set for the corresponding address in the other bank. Thus, cache writes may be directed to the cache bank whose contents were least recently used, thereby preserving the more recently used data for subsequent accesses by the CPU. An associative cache significantly improves the cache hit rate and thus improves overall system performance.

Additional banks of SRAM may be added to create a four-way, eight-way, etc., associative cache. However, the increase in system performance with increased associativity is non-linear and it is generally felt that four-way associativity provides an optimal performance/cost tradeoff. Prior art cached systems incur significantly higher power consumption as the cache associativity is increased. Although total cache memory remains constant, a four-way associative cache consumes significantly more power than a direct-mapped cache since the power consumption of each SRAM device is not proportional to the size of the SRAM array. Furthermore, a four-way associative cache will require four times as many SRAM packages as a direct-mapped cache, thereby occupying more area on the processor circuit board.

One of the objects of the present invention is to implement an associative cache using a single bank of SRAM, thereby achieving the superior hit rate performance of an associative cache without incurring the component cost, power consumption and real estate penalties of prior art associative cache subsystems.

SUMMARY OF THE INVENTION

In the present invention, a cache controller is intimately associated with a microprocessor CPU on a single chip. The physical address bus is routed directly from the CPU to the cache controller where it is sent to the cache tag directory table. For a cache hit, the cache address is remapped to the proper cache set address. For a cache miss, the cache address is remapped in accordance with the LRU logic to direct the cache write to the least recently used set. The cache is thereby functionally divided into associative sets, but without the need to physically divide the cache into independent banks of SRAM.

Prior art associative caches cannot be implemented in a single bank of SRAM since there is no practical way to decode the cache tags prior to accessing data in the cache. While it would be possible to decode the tags first and then remap the cache address to the proper cache set, this would require at least one additional clock cycle, thereby defeating the very purpose of caching, or would require prohibitively fast SRAMS. In the present invention, however, the cache controller is co-located on the same chip as the CPU permitting access to the unbuffered address lines so that remapping of the cache address following interrogation of the cache tag directory table is transparent to the CPU.

DETAILED DESCRIPTION OF THE INVENTION

In the following description, for purposes of explanation and not limitation, specific register structures, mappings, bit assignments, etc. are set forth in order to provide a thorough understanding of the present invention. However, it will be apparent to one skilled in the art that the present invention may be practiced in other embodiments that depart from these specific details. In other instances, detailed descriptions of well known aspects of microprocessor systems are omitted so as to not obscure the description of the present invention with unnecessary detail.

System Overview

The present invention is advantageously employed in a microprocessor design optimized for applications requiring low power consumption and compact size. Such applications particularly include small personal computers of the types commonly referred to as laptops and notebooks. One embodiment of such a microprocessor is briefly described below; however, it is to be understood that the present invention is not limited to this particular microprocessor design, and may be incorporated in virtually any processor design.

Figure 1:
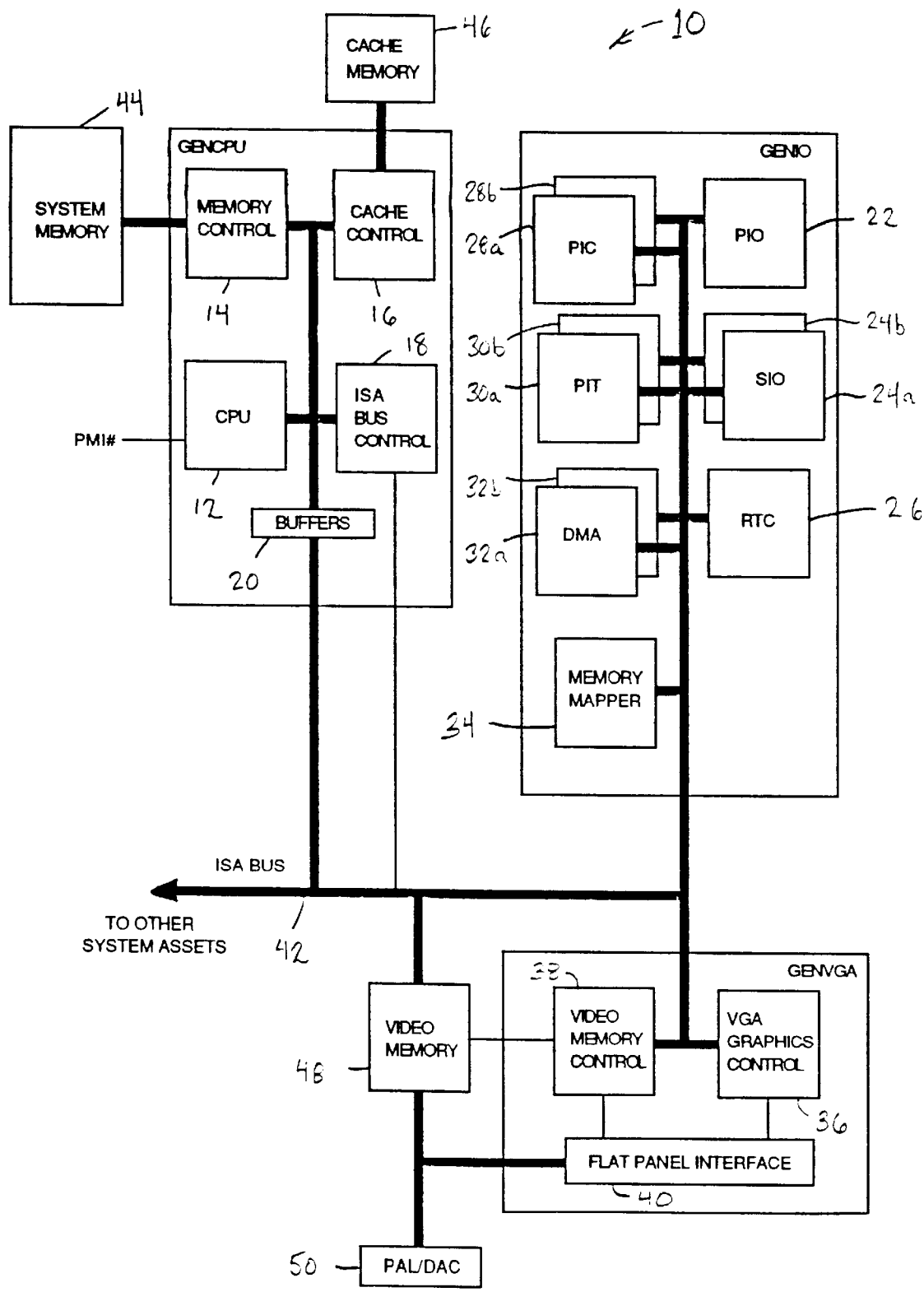
FIG. 1 is a functional block diagram of a microprocessor system embodying the present invention.

Referring to FIG. 1, a processor system 10 is shown. System 10 comprises three main processor components, designated as GENCPU, GENIO and GENVGA. GENCPU is an expanded central processing unit including the CPU 12, a memory controller 14, a cache controller 16, ISA bus control logic 18 and line buffers 20.

In the described embodiment, CPU 12 is essentially a 386™SX CPU manufactured by Intel Corporation, the corporate assignee of this invention. Throughout this description, certain terminology relating to the 386™SX CPU, such as register names, signal nomenclature, etc., is employed to describe the present invention. Such terminology is understood by practitioners in the field of microprocessor design and will therefore not be explained at length herein. For further information relating to the internal structure of CPU 12, reference is made to the "386™SX Microprocessor Hardware Reference Manual" published by Intel Corporation as publication number 240332 and related publications.

GENIO is a single chip input/output unit comprising parallel ports 22, dual serial ports 24a, 24b, real time clock unit 26, dual programmable interrupt controllers 28a, 28b, dual programmable timers 30a, 30b, dual DMA controllers 32a, 32b and memory mapper 34.

GENVGA is a single chip graphics interface comprising VGA graphics controller 36, video memory controller 38 and interface 40 for a flat panel display unit.

All of the processor units communicate with one another and with other system components (such as expansion slots, keyboard controller, disk controllers, etc.) via ISA bus 42.

External to the three main components of system 10 are system memory 44, optional cache memory 46 and optional video memory 48. An optional PAL/DAC unit 50 provides a video interface with a conventional VGA monitor.

Cache Implementation

Figure 2:
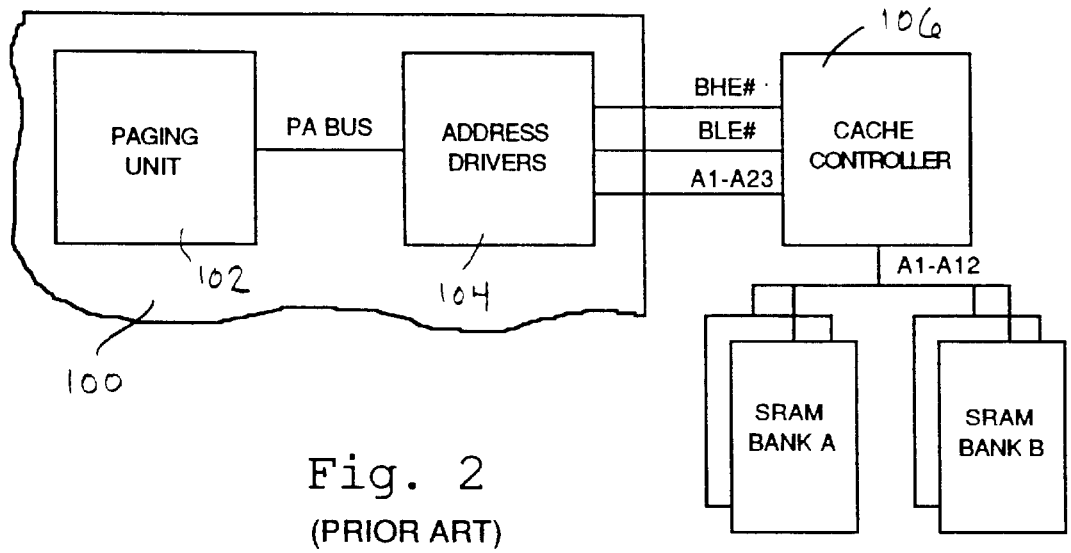
FIG. 2 illustrates a prior art cache implementation.

FIG. 2 illustrates a prior art cache implementation with a microprocessor 100, such as an Intel 386™SX. The 25-bit physical address bus or PABUS is provided from paging unit 102 to address drivers 104. These drivers provide chip outputs BHE# (byte high enable), BLE# (byte low enable) and address bits A1–A23. An external cache controller 106, such as an Intel 82385SX, is coupled to these CPU outputs.

Controller 106 supports an 8K two-way set associative cache in which any system memory location may be mapped into one of two cache memory locations, one in SRAM bank A and one in SRAM bank B. Each SRAM bank comprises a pair of 4K×8 SRAM devices. Address bits A1–A12 are used to access the SRAM banks and are simultaneously sent to the tag directory table where address bits A4–A12 define a 9-bit set address and bits A1–A3 define a 3-bit line select field. Address bits A13–A23 comprise an 11-bit tag field which controller 106 compares with the tags stored in the directory table for the locations in banks A and B defined by the 9-bit set address. If the tag field matches the tag location of either bank and the appropriate tag and line valid bits are set (as determined by address lines A1–A3), a cache hit is declared. If the tag field matches the tag location of one of the banks, and the tag valid bit is set, but the appropriate line valid bit is not set (as determined by address lines A1–A3), a tag hit is declared. If the tag field does not match the tag location of either bank or the appropriate tag valid bit is not set, then a cache miss is declared. In the case of a cache read hit, data from the matched bank (low byte, high byte, or both depending on the states of BHE# and BLE#) are gated onto the local data bus. In the case of a cache write hit, data is written to the matched bank from the local bus. In the case of a write miss, no action is taken by the cache. In the case of a read miss, the bank determined to be least recently used is updated with an entire line of data read from the main memory. Tag hit cycles are treated as cache misses.

Figure 3:
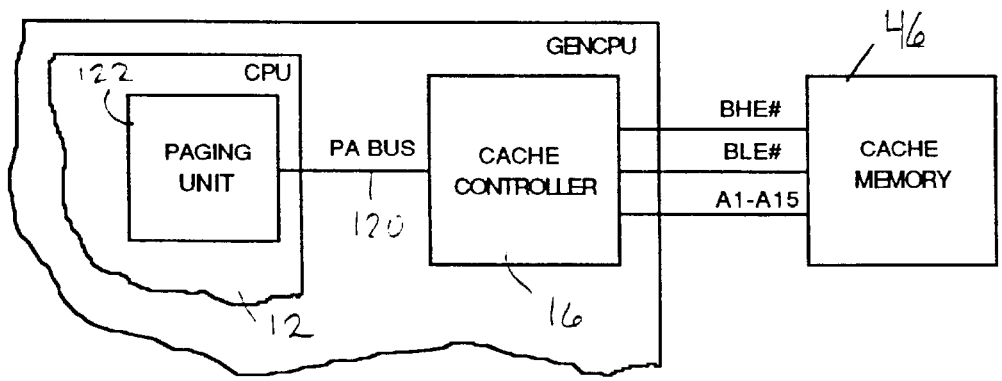
FIG. 3 illustrates the cache implementation of the present invention.

A cache implementation according to the present invention is shown in FIG. 3, which is a partially expanded view of system 10 shown in FIG. 1.

First of all, it will be recognized that CPU 12 and cache controller 16 are co-resident on a single chip, thereby facilitating the direct exchange of signals without line drivers. Physical address bus 120 from paging unit 122 of CPU 12 is coupled directly to cache controller 16 without intervening address drivers, and hence without the delay inherent in going off-chip as in the prior art embodiment shown in FIG. 2. This permits the physical address request to access the cache tag directory table without the penalty of a wait state in CPU 12.

The address on PABUS 120 first goes to the cache tag directory table of cache controller 16. As in prior art cache systems, a cache hit is declared if the tag field matches an entry in the table and the appropriate tag and line valid bits are set, a tag hit is declared if the tag field matches an entry in the table and the appropriate tag and line valid bits are not set, and a cache miss is declared if the tag field does not match an entry in the table or the appropriate tag valid bit is not set. Unlike prior art cached systems, however, the cache address is mapped by the cache controller to a single bank of SRAM according to the set in the tag directory in which a tag hit was found. If no tag hit occurs, the cache address is mapped by the cache controller to the least recently used (IRU) cache set.

For a cache read hit, data is read from the single bank of SRAM onto the local bus. For a cache write hit, data is written to the appropriate SRAM location. No action is taken for cache write misses unless they are 16-bit writes (the cache line width is 16-bits) in which case the data is written to the SRAM location corresponding to the tag that was hit (if a tag hit occurred) or the location pointed to by the LRU (if no tag hit occurred). Cache read misses are updated in the same manner as a 16-bit cache write miss but are always treated as 16-bit regardless of the values of BLE# and BHE#.

A preferred embodiment of the present invention provides the capability of supporting 16K, 32K or 64K caches with direct mapped, 2-way or 4-way set associative organization. In the case of a 64K 4-way set associative cache, cache memory 46 comprises two 32K×8 SRAM devices (one SRAM for the low byte and one for the high byte). The cache is partitioned into four 16K sets, the address within each set determined by address bits A1–A11 and A14–A15. Address bits A12–A13 are generated by cache controller 16 in accordance with the set in which a tag match is found in the case of a tag hit or with the LRU set as described above if no tag hit occurs.

A 64K two-way set associative cache is implemented in the identical fashion, except that only address bit A13 is remapped by the cache controller. For a 16K cache, the address within a set is defined by bits A1–A11 only, and for a 32K cache bit A14 is also required.

To implement a direct mapped cache, the tag directory table is simply bypassed, and all cache address bits are mapped directly through the cache controller in the same manner as in prior art direct mapped cache systems.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A processor, comprising:
    a central processing unit (CPU);
    a cache controller, coupled in communication with the CPU; and
    an interface to couple the cache controller in communication with a memory cache comprising a single external memory bank, said interface including a plurality of address lines and set denoting bit lines for accessing the cache memory as a data array including $2^n$ ways;
    wherein said cache controller provides memory bank access operations in response to memory access requests from the CPU such that the external memory bank is accessed as a $2^n$ way set associative cache.

2. The processor of claim 1, wherein the cache controller includes an address tag array, and wherein in response to a read access request from the CPU the cache controller performs the operations of:
    accessing the address tag array for a cache hit/miss determination;
    generating a cache address by combining n address bits with a plurality of set and line denoting address bits in accordance with the results of the cache hit/miss determination, and
    accessing only one of the $2^n$ ways of the data array using the generated cache address.

3. The processor of claim 2, wherein the cache controller further comprises tag matching circuitry coupled to the address tag array for performing the cache hit/miss determination, and cache address mapping circuitry coupled to the tag matching circuitry for performing the cache address generation.

4. The processor of claim 1, wherein if a cache hit is detected, the n-address bits are combined with the plurality of set and line denoting address bits to denote the way where the cache hit was detected.

5. The processor of claim 1, wherein if a cache miss is detected, the n-address bits are combined with the plurality of set and line denoting bits to denote a way that was least recently used.

6. The processor of claim 1, wherein the cache controller provides support for accessing the external memory bank as a direct mapped cache.

7. The processor of claim 1, wherein the CPU further includes a memory paging unit coupled in communication with the cache controller via an internal bus.

8. A computer system, comprising:
    a processor including
        a central processing unit (CPU);
        a cache controller, coupled in communication with the central processing unit;
    a memory cache comprising a single memory bank; and
    an interface to couple the cache controller in communication with the single external memory bank, said interface including a plurality of address lines and set denoting bit lines for accessing the memory cache as a data array including $2^n$ ways;
    wherein the combination of the cache controller and the external memory bank function as a $2^n$ way set associative cache memory subsystem.

9. The processor of claim 8, wherein the cache controller includes an address tag array in which system memory address to cache way mapping information is stored, and wherein in response to a read access request from the CPU the cache controller performs the operations of:
    accessing the address tag array for a cache hit/miss determination;
    generating a cache address by combining n address bits with a plurality of set and line denoting address bits in accordance with the results of the cache hit/miss determination, and
    accessing only one of the $2^n$ ways of the data array using the generated cache address.

10. The processor of claim 9, wherein the cache controller further comprises tag matching circuitry coupled to the address tag array for performing the cache hit/miss determination, and cache address mapping circuitry coupled to the tag matching circuitry for performing the cache address generation.

11. The processor of claim 8, wherein if a cache hit is detected, the n-address bits are combined with the plurality of set and line denoting address bits to denote the way where the cache hit was detected.

12. The processor of claim 8, wherein if a cache miss is detected, the n-address bits are combined with the plurality of set and line denoting bits to denote a way that was least recently used.

13. The processor of claim 8, wherein the cache controller provides support for accessing the memory bank as a direct mapped cache.

* * * * *

UNITED STATES PATENT AND TRADEMARK OFFICE
CERTIFICATE OF CORRECTION

PATENT NO.    : 6,687,790 B2
DATED         : February 3, 2004
INVENTOR(S)   : Zager et al.

It is certified that error appears in the above-identified patent and that said Letters Patent is hereby corrected as shown below:

Column 4,
Line 28, delete "(IRU)", insert -- (LRU) --.

Signed and Sealed this

Twenty-seventh Day of April, 2004

JON W. DUDAS
*Acting Director of the United States Patent and Trademark Office*